US011818607B2

(12) United States Patent
Gomes

(10) Patent No.: US 11,818,607 B2
(45) Date of Patent: *Nov. 14, 2023

(54) APPARATUS SYSTEMS AND METHODS FOR PROXIMITY-BASED SERVICE DISCOVERY AND SESSION SHARING

(71) Applicant: DISH NETWORK TECHNOLOGIES INDIA PRIVATE LIMITED, Karnataka (IN)

(72) Inventor: Conrad Savio Jude Gomes, Salcete (IN)

(73) Assignee: DISH NETWORK TECHNOLOGIES INDIA PRIVATE LIMITED

( * ) Notice: Subject to any disclaimer, the term of this patent is extended or adjusted under 35 U.S.C. 154(b) by 0 days.

This patent is subject to a terminal disclaimer.

(21) Appl. No.: 17/952,049

(22) Filed: Sep. 23, 2022

(65) Prior Publication Data
US 2023/0013305 A1 Jan. 19, 2023

Related U.S. Application Data

(63) Continuation of application No. 16/726,566, filed on Dec. 24, 2019, now Pat. No. 11,490,222, which is a
(Continued)

(51) Int. Cl.
*H04W 28/086* (2023.01)
*H04L 47/127* (2022.01)
(Continued)

(52) U.S. Cl.
CPC ....... *H04W 28/0861* (2023.05); *H04L 47/125* (2013.01); *H04L 47/127* (2013.01); *H04L 47/215* (2013.01); *H04W 28/0942* (2020.05)

(58) Field of Classification Search
CPC ......... H04L 67/16; H04L 67/18; H04L 67/20; H04L 67/22; H04L 67/24; H04L 67/36;
(Continued)

(56) References Cited

U.S. PATENT DOCUMENTS 7,039,033 B2    5/2006  Haller et al.
7,864,043 B2 *  1/2011  Camp, Jr. ........... G01S 5/02521
                                                      340/8.1
(Continued)

FOREIGN PATENT DOCUMENTS

CN     110662260 A    1/2020
CN     112567799 A    3/2021
(Continued)

OTHER PUBLICATIONS

"3rd Generation Partnership Project; Technical Specification Group Services and System Aspects; System architecture for 5G System (5GS); Stage 2 (Release 16)", vol. SA WG2, No. V16.9.0, Jun. 24, 2021, pp. 1-452.
(Continued)

*Primary Examiner* — Farzana B Huq
(74) *Attorney, Agent, or Firm* — Xuezhen Tian; VLP Law Group LLP

(57) ABSTRACT

Methods and systems are provided that facilitate sharing or a hand-off of program content or a user session (e.g., running within a computer application) of a user device such that a user can easily select and then switch devices on which program content is being viewed or on which a user session is being run without having to sift through a myriad of other devices such as remote discoverable devices on the same network that are not in close proximity to the user device. A user device determines which of a plurality of discovered devices from which a short range wireless signal including a defined key was received and provides a list of discovered devices with which a session may be shared over the computer network with the user device based on this determination.

8 Claims, 6 Drawing Sheets

Related U.S. Application Data continuation of application No. 15/905,071, filed on Feb. 26, 2018, now Pat. No. 10,555,117, which is a continuation of application No. 13/282,264, filed on Oct. 26, 2011, now Pat. No. 9,936,351.

(51) Int. Cl.
  *H04L 47/125* (2022.01)
  *H04W 28/08* (2023.01)
  *H04L 47/215* (2022.01)

(58) Field of Classification Search
  CPC ..... H04L 67/306; H04L 12/24; H04L 12/282; H04L 2012/2841; H04L 63/18; H04L 63/102
  See application file for complete search history.

(56) References Cited

U.S. PATENT DOCUMENTS

| | | |
|---|---|---|
| 8,015,306 B2 | 9/2011 | Bowman |
| 8,131,272 B2 | 3/2012 | Paalasmaa et al. |
| 10,470,152 B2 | 11/2019 | Park et al. |
| 10,568,061 B1 | 2/2020 | Park et al. |
| 10,602,415 B2 | 3/2020 | Bae et al. |
| 10,708,824 B2 | 7/2020 | Lee et al. |
| 10,841,838 B2 | 11/2020 | Zhang et al. |
| 11,051,192 B2 | 6/2021 | Li et al. |
| 11,096,046 B2 | 8/2021 | Li et al. |
| 11,343,698 B2 | 5/2022 | Jeong et al. |
| 11,412,412 B2 | 8/2022 | Narath et al. |
| 11,477,694 B1 | 10/2022 | Alasti et al. |
| 11,483,738 B1 | 10/2022 | Alasti et al. |
| 11,516,090 B2 | 11/2022 | Rtenblad et al. |
| 11,563,713 B2 | 1/2023 | Feng |
| 11,582,641 B1 | 2/2023 | Alasti et al. |
| 11,595,851 B1 | 2/2023 | Alasti et al. |
| 11,627,492 B2 | 4/2023 | Alasti et al. |
| 2002/0180887 A1 | 12/2002 | Kim et al. |
| 2005/0266798 A1 | 12/2005 | Moloney et al. |
| 2006/0003802 A1 | 1/2006 | Sinai |
| 2006/0234631 A1 | 10/2006 | Dieguez |
| 2008/0007651 A1 | 1/2008 | Bennett |
| 2008/0147798 A1 | 6/2008 | Paalasmaa et al. |
| 2009/0112980 A1 | 4/2009 | Fujimoto |
| 2009/0177996 A1 | 7/2009 | Hunt et al. |
| 2009/0238170 A1 | 9/2009 | Rajan et al. |
| 2009/0251594 A1 | 10/2009 | Hua et al. |
| 2009/0325595 A1 | 12/2009 | Farris et al. |
| 2010/0031139 A1 | 2/2010 | Ihara |
| 2010/0167646 A1 | 7/2010 | Alameh et al. |
| 2010/0194753 A1 | 8/2010 | Robotham et al. |
| 2011/0028129 A1 | 2/2011 | Hutchison et al. |
| 2011/0304583 A1 | 12/2011 | Kruglick |
| 2012/0170561 A1 | 7/2012 | Tsai et al. |
| 2012/0190299 A1 | 7/2012 | Takatsuka et al. |
| 2012/0290653 A1 | 11/2012 | Sharkey et al. |
| 2012/0317194 A1* | 12/2012 | Tian .......... H04L 69/14 709/204 |
| 2013/0090064 A1* | 4/2013 | Herron .......... H04W 8/005 455/41.2 |
| 2013/0147845 A1 | 6/2013 | Xie et al. |
| 2015/0128030 A1 | 5/2015 | Tyagi |
| 2016/0203585 A1 | 7/2016 | Welinder et al. |
| 2016/0231978 A1 | 8/2016 | Hawver et al. |
| 2016/0234522 A1 | 8/2016 | Lu et al. |
| 2016/0316243 A1 | 10/2016 | Park et al. |
| 2018/0262924 A1 | 9/2018 | Dao et al. |
| 2018/0324646 A1 | 11/2018 | Lee et al. |
| 2019/0053117 A1 | 2/2019 | Bae et al. |
| 2019/0075431 A1 | 3/2019 | Albasheir et al. |
| 2019/0191330 A1 | 6/2019 | Dao et al. |
| 2020/0068587 A1 | 2/2020 | Garcia Azorero et al. |
| 2021/0045091 A1 | 2/2021 | Arora et al. |
| 2021/0051531 A1 | 2/2021 | Alasti et al. |
| 2021/0105652 A1 | 4/2021 | Jeong et al. |
| 2021/0219179 A1 | 7/2021 | Narath et al. |
| 2021/0288886 A1 | 9/2021 | Rtenblad et al. |
| 2021/0314842 A1 | 10/2021 | Padlikar et al. |
| 2021/0329485 A1 | 10/2021 | Han et al. |
| 2021/0377807 A1 | 12/2021 | Lee |
| 2021/0385625 A1 | 12/2021 | Qiao et al. |
| 2022/0039177 A1 | 2/2022 | Talebi et al. |
| 2022/0078857 A1 | 3/2022 | Kim |
| 2022/0159605 A1 | 5/2022 | Li et al. |
| 2022/0167211 A1 | 5/2022 | Sharma et al. |
| 2022/0210658 A1 | 6/2022 | Lee |
| 2022/0247688 A1 | 8/2022 | Puente et al. |
| 2022/0264258 A1 | 8/2022 | Zong et al. |
| 2022/0369170 A1 | 11/2022 | Roeland et al. |
| 2022/0369204 A1 | 11/2022 | Jeong et al. |
| 2023/0067535 A1 | 3/2023 | Alasti et al. |
| 2023/0156522 A1 | 5/2023 | Bashir et al. |
| 2023/0239227 A1 | 7/2023 | Espinosa et al. |

FOREIGN PATENT DOCUMENTS

| | | |
|---|---|---|
| CN | 112867050 A | 5/2021 |
| CN | 113475123 A | 10/2021 |
| EP | 3955523 A1 | 2/2022 |
| KR | 10-2106778 B1 | 5/2020 |
| WO | 2019/160546 A1 | 8/2019 |
| WO | 2020/032769 A1 | 2/2020 |
| WO | 2021/063515 A1 | 4/2021 |
| WO | 2021/091225 A1 | 5/2021 |
| WO | 2021/155940 A1 | 8/2021 |
| WO | 2021/261074 A1 | 12/2021 |
| WO | 2022/033896 A1 | 2/2022 |
| WO | 2022/053134 A1 | 3/2022 |
| WO | 2022/098696 A1 | 5/2022 |
| WO | 2022/157667 A1 | 7/2022 |
| WO | 2022/192523 A | 9/2022 |

OTHER PUBLICATIONS

3GPP TS 29.520 V17.4.0, "3rd Generation Partnership Project; Technical Specification Group Core Network and Terminals; 5G System; Network Data Analytics Services; Stage 3; (Release 17)," 3GPP Organizational Partners, 133 pages, Sep. 2021.

Alasti et al., "User Plane Function (UPF) Load Balancing Based On Central Processing Unit (CPU) and Memory Utilization of the User Equipment (UE) in the UPF," U.S. Appl. No. 17/459,279, Filed Aug. 27, 2021. (63 pages).

Alasti et al., "User Plane Function (UPF) Load Balancing Based On Current UPF Load and Thresholds That Depend On UPF Capacity." USAN: U.S. Appl. No. 17/400,943, filed Aug. 12, 2021. (65 pages).

Alasti et al., "User Plane Function (UPF) Load Balancing Based On Network Data Analytics To Predict Load of User Equipment," U.S. Appl. No. 17/458,117, Filed on Aug. 26, 2021 (62 pages).

Alasti et al., "User Plane Function (UPF) Load Balancing Based On Special Considerations for Low Latency Traffic," U.S. Appl. No. 17/458,120, dated Aug. 26, 2021. (62 pages).

Alasti et al., "User Plane Function (UPF) Load Balancing Supporting Multiple Slices," USAN: U.S. Appl. No. 17/458,889, dated Aug. 27, 2021. (67 pages).

Bashir, Kazi et al., "Predictive User Plane Function (UPF) Load Balancing Based On Network Data Analytics", U.S. Appl. No. 17/529,128, dated Nov. 17, 2021, 32 pages.

International Search Report and Written Opinion received for PCT Patent Application No. PCT/US2022/049596, dated Mar. 3, 2023, 10 pages.

International Search Report and Written Opinion received for PCT Patent Application No. PCT/US22/040157, dated Nov. 21, 2022, 13 pages.

International Search Report and Written Opinion received for PCT Patent Application No. PCT/US22/041334, dated Nov. 30, 2022, 14 pages.

International Search Report and Written Opinion received for PCT Patent Application No. PCT/US22/041343, dated Dec. 5, 2022, 14 pages.

(56) References Cited

OTHER PUBLICATIONS

Marappan, "NWDAF: Automating the 5G network with machine learning and data analytics", Jun. 2020, 7 pages.
Samsung, et al., "Key Issue 6 Solution Evaluation and Conclusion", 3GPP Draft; S2-1812183_Key Issue 6 Solution Evaluation and Conclusion, 3RD Generation Partnership Project (3GPP), vol. SA WG2, XP051498907, http://www.3gpp.org/ftp/tsg%5Fsa/WG2%5FArch/TSGS2%5F129BIS%5FWest%5FPalm%5FBeach/Docs/S2% 2D1812183%2Ezip, Nov. 20, 2018, 10 pages.

\* cited by examiner

APPARATUS SYSTEMS AND METHODS FOR PROXIMITY-BASED SERVICE DISCOVERY AND SESSION SHARING

TECHNICAL FIELD

The technical field relates to data sharing and more particularly, to apparatus, systems and methods for sharing data and content between devices within close proximity to each other.

BRIEF SUMMARY

In one example embodiment, a proximity-based service discovery system includes a user device that receives information regarding a plurality of discovered devices on a computer network. In response to receiving this information, the user device sends instructions via the computer network to the plurality of discovered devices for the plurality of discovered devices to each send a short range wireless signal including a defined key.

The user device then receives a separate short range wireless signal including the defined key from one or more of the plurality of discovered devices. This short range wireless signal is not received via the computer network. The user device then determines which of the plurality of discovered devices from which the short range wireless signal including the defined key was received and provides a list of discovered devices with which a session may be shared over the computer network with the user device based on this determination. This is such that a user can easily select and then switch devices on which program content is being viewed or on which a user session is being run without having to sift through a myriad of other devices such as remote discoverable devices on the network that are not in close proximity to the user device.

In some embodiments, the discovery mechanism works in both ways. For example, the user device may emit a short range wireless signal to which the discoverable devices in proximity to the user device may respond. The discoverable devices in proximity to the user device may respond wirelessly directly to the user device in response to receiving the short range wireless signal from the user device to enable the user device to determine which discoverable devices are in proximity to the user device. Also, the discoverable devices may respond via the computer network to the user device such that the user device may receive an updated list of discoverable devices in proximity to the user device. In this way, not all of the discoverable devices need to send a short range wireless signal if they have already been established as being in proximity to the user device by receiving the short range wireless signal from the user device. The discoverable devices in proximity to the user device may also use the short range wireless signal received from the user device to update and store their own lists of discoverable devices with which a session may be shared over the computer network.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

A. Environment Overview

Figure 1:
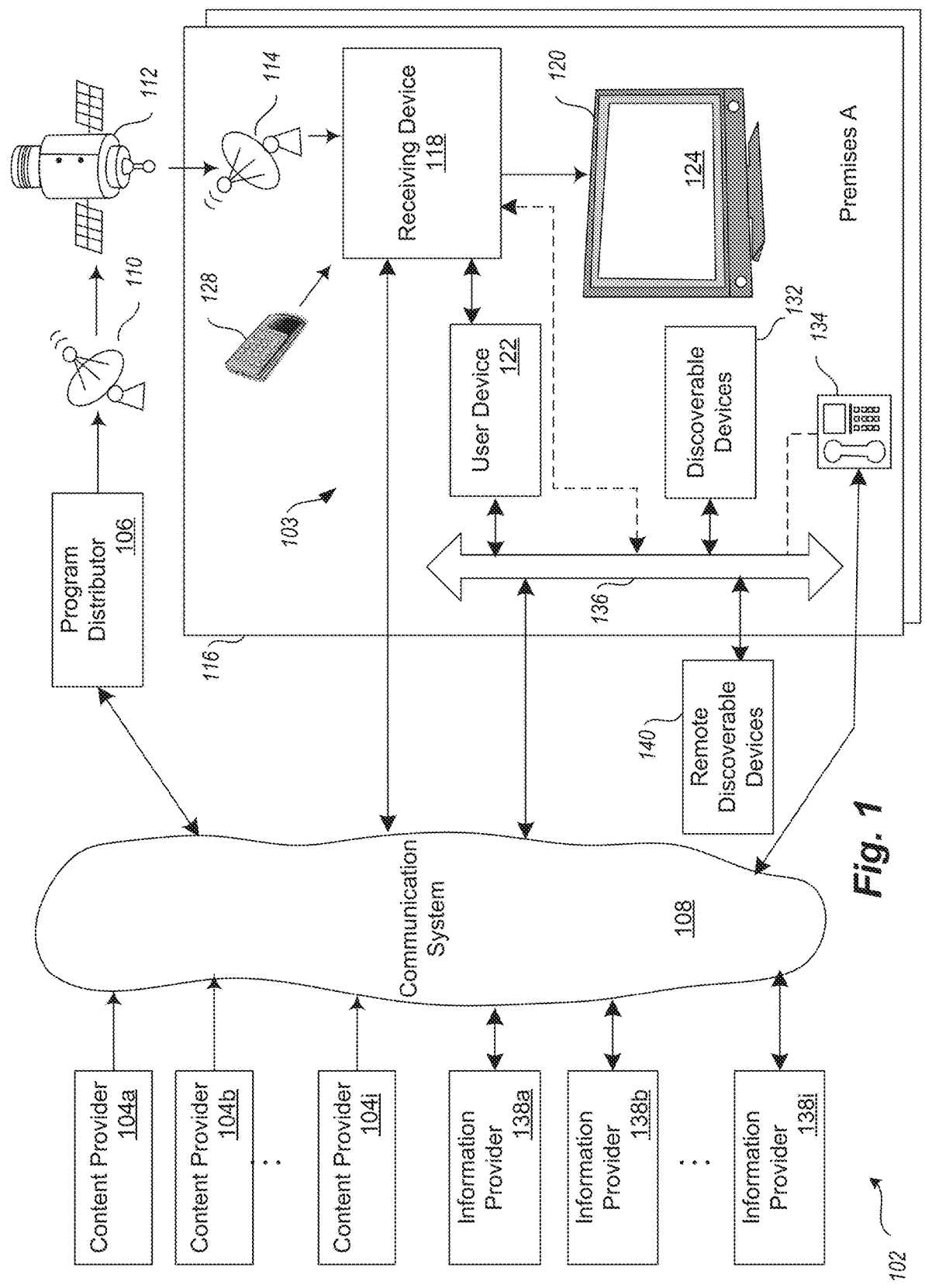
FIG. 1 is a block diagram illustrating an example communication system in which embodiments of a proximity-based service discovery system may be implemented.

FIG. 1 is an overview block diagram illustrating an example communication environment 102 in which embodiments of a proximity-based service discovery system 103 are implemented. The proximity-based service discovery system 103 facilitates sharing, transferring or a hand-off of program content or a user session (e.g., running within a computer application) of a user device 122 with discoverable devices 132 that are on the same network and also within relatively close proximity to the user device 122. This is such that a user can easily select and then switch devices on which program content is being viewed or on which a user session is being run without having to sift through a myriad of other devices such as remote discoverable devices 140 on the network that are not in close proximity to the user device 122.

It is to be appreciated that FIG. 1 illustrates just one example and the various embodiments discussed herein are not limited to communication environment 102. In addition, communication environment 102 can include a variety of communication systems and can use a variety of communication media including, but not limited to, satellite wireless media.

Although various embodiments of the proximity-based service discovery system 103 are discussed with respect to a communication environment 102 involving a one or more satellites 112, the various described techniques may apply to other types of content distribution systems, including but not limited to, cable systems, fiber optic systems, telephony systems, and the like. In addition, in various embodiments, the communication environment may provide various types of content, including, but not limited to, audio (e.g., music, audio books, etc.), video (e.g., television programs, movies, user-generated content, etc.), and other data content.

Service providers, including, but not limited to any combination of content providers 104*a* to 104*i*, information providers 138*a* to 138*i* and program distributor 106 provide audio, video, and/or data to customers located at one or more customer premises 116 (e.g., Premises A). This includes a multitude of audio/video and/or data programming (hereafter, collectively and/or exclusively "programming"). such as, but not limited to, that provided by television service providers. Such programming is often provided by use of a receiving device 118 communicatively coupled to a presentation device 120 configured to receive the programming.

Receiving device 118 interconnects to one or more communication sources (such as a cable head-end, satellite antenna, telephone company switch, Ethernet portal, off-air antenna, or the like) that provide the programming. The receiving device 118 commonly receives a plurality of programming by way of the communication sources described in greater detail below. Based upon selection by the user, the receiving device 118 processes and communicates the selected programming to the one or more presentation devices 120 and/or mobile user device 122.

The receiving device 118 includes any type of media content receiving device, such as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the receiving device 118 and in addition the presentation device 120 and other user devices 122.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display 124, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device or the mobile user device 122 may have the above-described functionality of the receiving device 118 and the presentation device 120, or may even have additional functionality.

A plurality of content providers 104a-104i provide program content, such as television content or audio content, to a distributor, such as the program distributor 106. Example content providers 104a-104i include television stations which provide local or national television programming, special content providers which provide premium based programming or pay-per-view programming, and radio stations which provide audio programming.

Program content, which may include specific programs or sessions, is communicated to the program distributor 106 from the content providers 104a-104i through suitable communication media, generally illustrated as communication system 108 for convenience. Communication system 108 may include many different types of communication platforms, now known or later developed. Non-limiting platform examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. Further, program content communicated from the content providers 104a-104i to the program distributor 106 may be communicated over combinations of media. For example, a television broadcast station may initially communicate program content, via an RF signal or other suitable medium that is received and then converted into a digital signal suitable for transmission to the program distributor 106 over a fiber optics system. As another non-limiting example, an audio content provider may communicate audio content via its own satellite system to the program distributor 106.

In at least one embodiment, the received program content is converted at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 to one or more receiver antennas 114. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters.

The receiver antenna 114 can be located at customer premises 116. Examples of customer premises 116 include a residence, a business, or any other suitable location operable to receive signals from satellite 112 or from network 136. The received signal is communicated, typically over a hard-wire connection, to a receiving device 118. The receiving device 118 is a conversion device that converts, also referred to as formatting, the received signal from antenna 114 into a signal suitable for communication to a presentation device 120 and/or a user device 122.

User device 122 may be any suitable device that is operable to receive a signal from the receiving device 118, another endpoint device, or from other devices external to the customer premises 116. Non-limiting examples of user device 122 include cellular telephones, smart phones, personal digital assistants, notebooks or tablet computers, optical media recorders, such as a compact disk ("CD") recorder, a digital versatile disc or digital video disc ("DVD") recorder, a digital video recorder ("DVR"), or a personal video recorder ("PVR"). User device 122 may also include game devices, magnetic tape type recorders, RF transceivers, and personal computers ("PCs").

Interface between the receiving device 118 and a user (not shown) may be provided by a hand-held remote device 128. Remote 128 typically communicates with the receiving device 118 using a suitable wireless medium, such as infrared ("IR"), RF, or the like. Other devices (not shown) may also be communicatively coupled to the receiving device 118 so as to provide user instructions. Non-limiting examples include game device controllers, keyboards, pointing devices, and the like.

The receiving device 118 or user device 122 may receive programming partially from, or entirely from, another source other than the above-described receiver antenna 114. For example, the receiving device 118 and user device 122 may receive programs from communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable medium. For example, the customer premises 116 includes a network 136 to which receiving devices 118, presentation devices 120, discoverable devices 132, and/or a variety of user devices 122 and remote discoverable devices 140 outside the customer premises 116 can be coupled, collectively referred to as endpoint devices. All of these endpoint devices may be discoverable on the network 136. These endpoint devices are discoverable by other devices on the network 136, for example, by using a discoverable device protocol such as Universal Plug and Play (UPnP) or other network protocol. Discoverable device protocols such as UPnP permit networked devices, such as personal computers, printers, Internet gateways, Wi-Fi access points and mobile devices to discover each other's presence on the network and establish functional network services for data sharing, communications, and entertainment.

The Non-limiting examples of network 136 include, but are not limited to, an Ethernet, twisted pair Ethernet, an intranet, a local area network ("LAN") system, or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax"), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various programs and/or services to the various devices residing in the customer premises 116, such as receiving device 118, discoverable devices 132, user device 122, and/or remote discoverable devices 140. For example, information provider 138a may provide requested information of interest to such devices, such as audio, video, and/or other types of data. Information providers 138a-138i may further perform various transactions on behalf of a user of a receiving device, such as when a user purchases a product or service via a receiving device 118 and/or one or more other devices of the user.

The above description of the communication environment 102 and the customer premises 116, and the various devices therein, is intended as a broad, non-limiting overview of an example environment in which various embodiments of a proximity-based service discovery system may be implemented. The communication environment 102 and the various devices therein, may contain other devices, systems and/or media not specifically described herein. The customer premises 116 may differ from one customer to another, may contain fewer, more and/or other devices, systems and/or media than those described herein.

As noted above, the content providers 104a-104i, the information providers 138a-138i, and/or the program distributor 106 may provide program content and/or various other types of content to a receiving device 118. In some embodiments, the content providers 104a-104i, the information providers 138a-138i, and/or the program distributor 106 may restrict access to program content and/or other types of content, such that distributed content may only be viewed by and/or otherwise accessed by authorized users. In some instances, access to program content may be controlled by encrypting the program content, such that only authorized devices and/or users may access the program content.

The receiving device 118 and/or user device 122 may store or otherwise have access to program content and/or other types of content received from various sources (e.g., content providers 104a-104i, information providers 138a-138i, program distributor 106), such as for use by a user of the receiving device. For example, in some embodiments, the receiving device 118 or user device 122 may store program content, such as for playback to a user of the receiving device 118 or user device 122 using DVR/PVR technology, pay-per-view services, and the like. Program content may include television programs, movies, etc., and/or portions thereof (e.g., clips). In addition, the receiving device may store or otherwise have access to various other types of content that may be presented by or otherwise used by a receiving device, such as including other audio/video content (e.g., user-generated content), audio content (e.g., music), image content (e.g., photographs), and/or various other types of information. In various embodiments, such program content and other content may be stored on various storage medium accessible to the receiving device 118 or user device 122, including one or more hard disks included in the receiving device 118, user device 122 and/or other devices that the receiving device 118 or user device 122 may access via a communication link (e.g., other discoverable devices 132), and/or other storage media (including removable storage media).

The various embodiments disclosed herein, provide techniques to facilitates sharing, transferring or a hand-off of program content or a user session (e.g., running within a computer application) of a user device 122 with discoverable devices 132 that are on the same network and also within relatively close proximity to the user device 122. This is such that a user can easily select and then switch devices on which program content is being viewed or on which a user session is being run without having to sift through a myriad of other devices such as remote discoverable devices 140 on the network that are not in close proximity to the user device 122. For example, such techniques may allow a customer A to quickly discover and detect discoverable devices 132 located on network 136 within proximity of user device 122 of customer A and differentiate them from remote discoverable devices 140. This enables sharing of content or a user session of a user device 122 located at customer A's premises with a group of one or more discoverable devices 132 (e.g., friends, family, clients, etc.) located at the customer premises 116. Also, vice versa, such techniques allow other users (e.g., friends, family, clients, etc.) to share such content or active sessions of their discoverable devices 132 with user device 122 of customer A located at customer A's premises by quickly discovering and detecting user device 122 of customer A within proximity of one or more of the discoverable devices 132 located on network 136.

The shared content may be acquired directly from the endpoint device via the network 136 or may be managed via or communicated through the communication system 108 under control of one or more content providers 104a-104i or one or more information providers 138a-138i. For example, if user device has an active streaming video session from content provider 104a, and then discovers one or more other discoverable devices 132 in proximity to user device 122 with which the session is to be transferred, then content provider 104a or information provider 138a may receive an indication originating from user device 122 to transfer the stream to the other discoverable device via the communication system 108. After having received and/or otherwise acquired the session or shared content from customer A's user device 122, from the content provider 104a, or from the information provider 138a, the shared content may be presented by or otherwise used by the other discoverable devices 132, such as for presentation on the other discoverable device 132 itself, an associated presentation device (e.g., presentation device 120), displaying on a television or other display, playing on a speaker, or the like.

In some embodiments, access to shared content or session of a user device 122 may be restricted such that only groups of one or more other discoverable devices 132 that are authorized to access the shared content or session may access or otherwise use the shared content. In at least some such embodiments, access to shared content of a first device may be restricted for use by a group of one or more authorized devices by providing access control information to the first device that enables the first device to encrypt content that it shares with the group of one or more authorized receiving devices, and separately providing access control information to the group of one or more other authorized devices that enables such devices to decrypt content that has been encrypted by the first device. Thus, in such an embodiment, only devices that have been provided with the appropriate access control information may decrypt content that is shared by the first device. In some embodiments, access control information is provided by a program distributor 106 to the various devices via a satellite network comprising antenna 110 and satellite 112. In addition, in at least some embodiments, some or all of the described techniques are performed by an embodiment of a proximity-based service discovery system, such as described in greater detail below.

Example embodiments described herein provide applications, tools, data structures and other support to implement a proximity-based service discovery system. In the following description, numerous specific details are set forth, such as data formats, code sequences, and the like, in order to provide a thorough understanding of the described techniques. Various of the embodiments described can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Content and Session Sharing Overview

Figure 2:
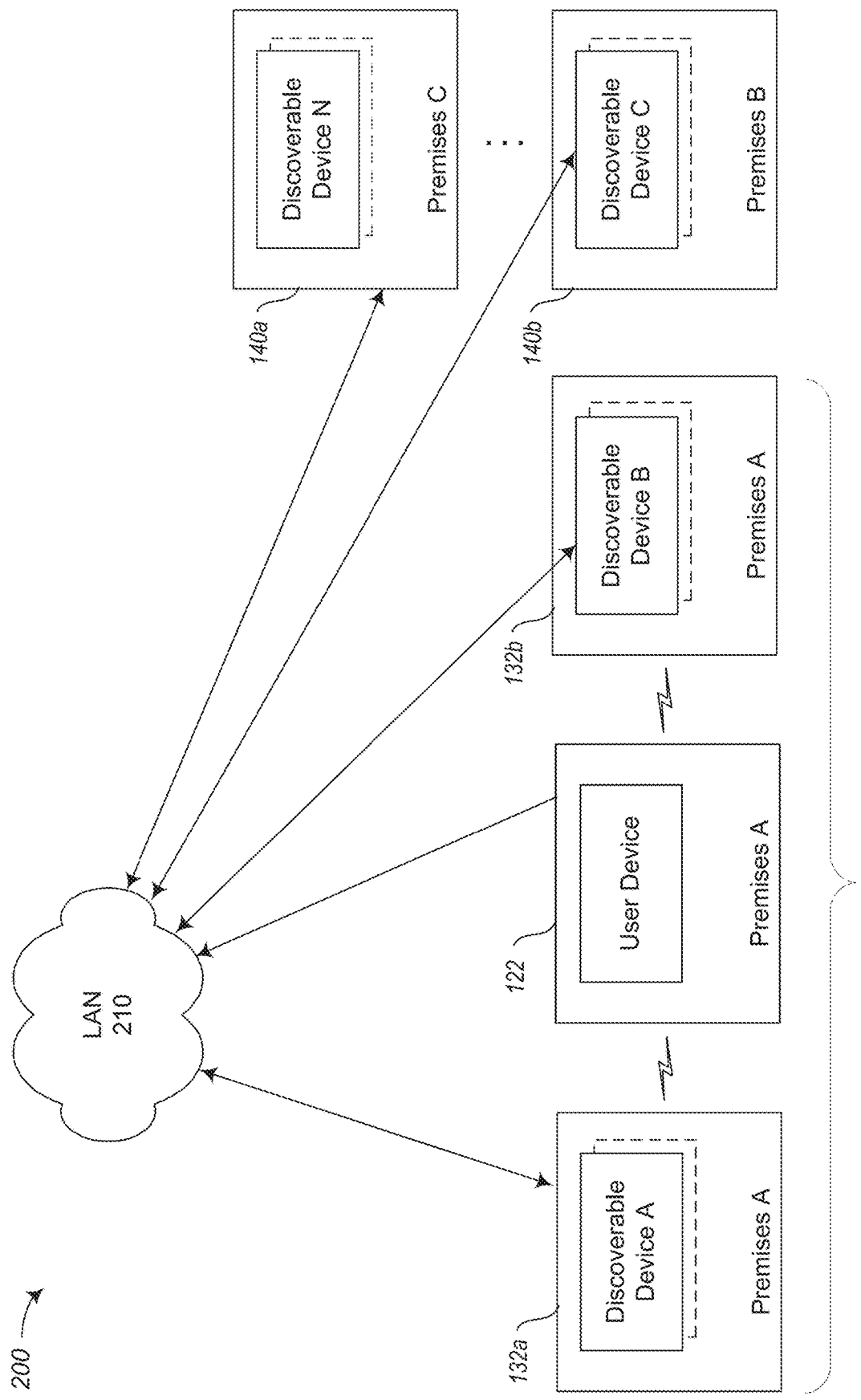
FIG. 2 is a block diagram illustrating an example embodiment of a proximity-based service discovery system.

FIG. 2 is a block diagram illustrating an example embodiment of portions of a proximity-based service discovery system 200. The system facilitates sharing, transferring or a hand-off of program content or a user session (e.g., running within a computer application) of a user device 122 with discoverable devices 132 that are on the same network and also within relatively close proximity to the user device 122. This is such that a user can easily select and then switch devices on which program content is being viewed or on which a user session is being run without having to sift through a myriad of other devices such as remote discoverable devices 140 on the network that are not in close proximity to the user device 122. This is performed by user device 122 quickly discovering and detecting discoverable devices 132a and 132b located on network 136 within proximity of user device 122 and differentiating them with remote discoverable devices 140a and 140b with which content or a user session may also be shared.

Various scenarios exist in which a user would want to transfer or share the content or current session running on their user device 122 to a different device. In one non-limiting example, if a user is currently viewing streaming video of a pay-per-view football game on their mobile device and then walks to their friend's house in which there is a device with having 60 inch wide screen display, the user may want to transfer the current streaming video session of the game onto their friend's device having the 60 inch wide screen. In order to do this, the user's mobile device may be able to discover the device having the 60 inch wide screen on a universal plug and play (UPnP) network but there may also be several other devices on the network that are not even in proximity of the user's mobile device from which to manually sift through to select to desired device.

As another example, two users in the same household may want to watch different programs. If a first program is currently being displayed on a first device (e.g., a television set), the first program can be transferred to be displayed on another device (e.g., a cellular telephone) that is within proximity to the first device. In order to do this, the user's television set may be able to discover the cellular telephone on a universal plug and play (UPnP) network but there may also be several other devices on the network that are not even in proximity of the television set.

As another example, a user may be attending an exhibition where there are many monitors displaying different content to the attendees walking around the exhibition center. One attendee may be interested in viewing the content currently being displayed on one of the monitors, but does not want to stand in the same place in front of the monitor to finish viewing the content as the attendee is on their way to a different meeting. The attendee is able to stream a copy of the content being played on the monitor to their own mobile device. In order to do this, the user's mobile device may be able to discover the monitor on a universal plug and play (UPnP) network, but there may also be several other devices on the network that are not even in proximity of the user's mobile device that the user must manually sift through in order to select to desired device.

As yet another example, a user may be attending a meeting at a conference which has a large monitor for presentations in the room in which the meeting is currently being held. The user may be called upon to answer a question during the meeting and decides that a showing a video on the user's web site to the other meeting attendees on the large display would be helpful. From their seat, the user is able to play the video on their mobile device and then transfer that streaming video session to the large monitor in the conference room. In order to do this, the user's mobile device may be able to discover the large monitor on a universal plug and play (UPnP) network, but there may also be several other devices on the network that are not even in proximity of the user's mobile device that the user must manually sift through in order to select to desired device.

In order to quickly determine which devices are within proximity of the user device 122, the user device 122 may automatically send instructions over the network (e.g., LAN 210) to all the other discovered devices (e.g., devices 132a, 132b, 140a, and 140b) to emit a short range wireless signal including a device identifier and/or a defined key directly to the user device 122 as shown in FIG. 2, or alternatively over a short range wireless network. When the signal is received by the user device 122, it will enable the user device to determine which of those discovered devices are within proximity of the user device 122 and which are not because the short range wireless signal will only be received from those discovered devices that are within short range wireless proximity of the user device 122.

For example, in response to information regarding the plurality of discovered devices on the computer network 210, the user device 122 sends instructions over the computer network 210 to the plurality of discovered devices (e.g., devices 132a, 132b, 140a, and 140b) for the plurality of discovered devices to each send a short range wireless signal including a defined key. The user device 122 then receives the short range wireless signal including the defined key from one or more of the plurality of discovered devices (in this case, devices 132*a* and 132*b*). Although all the discoverable devices (132*a*, 132*b*, 140*a*, and 140*b*) that are able to emit the short range wireless signal do so, only those that are in proximity to user device 122 are actually received by user device 122. The user device 122 then determines which of the plurality of discovered devices from which the short range wireless signal including the defined key was received. The user device 122 then generates a list of discovered devices with which a session may be shared over the computer network 210 with the user device 122 based on the determination of which of the plurality of discovered devices from which the short range wireless signal including the defined key was received. This is in order to determine which of the plurality of discovered devices are in proximity of the user device by determining that only devices from which the short range wireless signal including the defined key was received are in proximity to the user device 122.

In the present example shown in FIG. 2, discoverable devices 132*a* and 132*b* were those from which the short range wireless signal was received. Thus, the user device displays only those two devices 132*a* and 132*b* in a list as available in proximity to the user device, such that the user of user device 122 need only select from two devices to which to transfer or share content or a session instead of all four devices 132*a*, 132*b*, 140*a*, and 140*b*. The number of devices is for illustrative purposes only and may vary depending on the total number of discoverable devices on the LAN 210.

In some embodiments, the discovery mechanism of those discoverable devices within proximity to each other works in both ways. For example, the user device 122 may emit a short range wireless signal to which the discoverable devices 132*a* and 132*b* in proximity to the user device 122 may respond. The discoverable devices 132*a* and 132*b* in proximity to the user device 122 may respond wirelessly directly to the user device 122 in response to receiving the short range wireless signal from the user device 122 to enable the user device 122 to determine which discoverable devices are in proximity to the user device 122. Also, the discoverable devices may respond via the computer network 210 to the user device 122 such that the user device may receive an updated list of discoverable devices 132*a* and 132*b* in proximity to the user device 122. In this way, not all of the discoverable devices need to send a short range wireless signal if they have already been established as being in proximity to the user device 122 by receiving of the short range wireless signal from the user device 122. The discoverable devices 132*a* and 132*b* in proximity to the user device 122 may also use the short range wireless signal received from the user device 122 to update and store their own lists of discoverable devices with which a session may be shared over the computer network 210.

Figure 3:
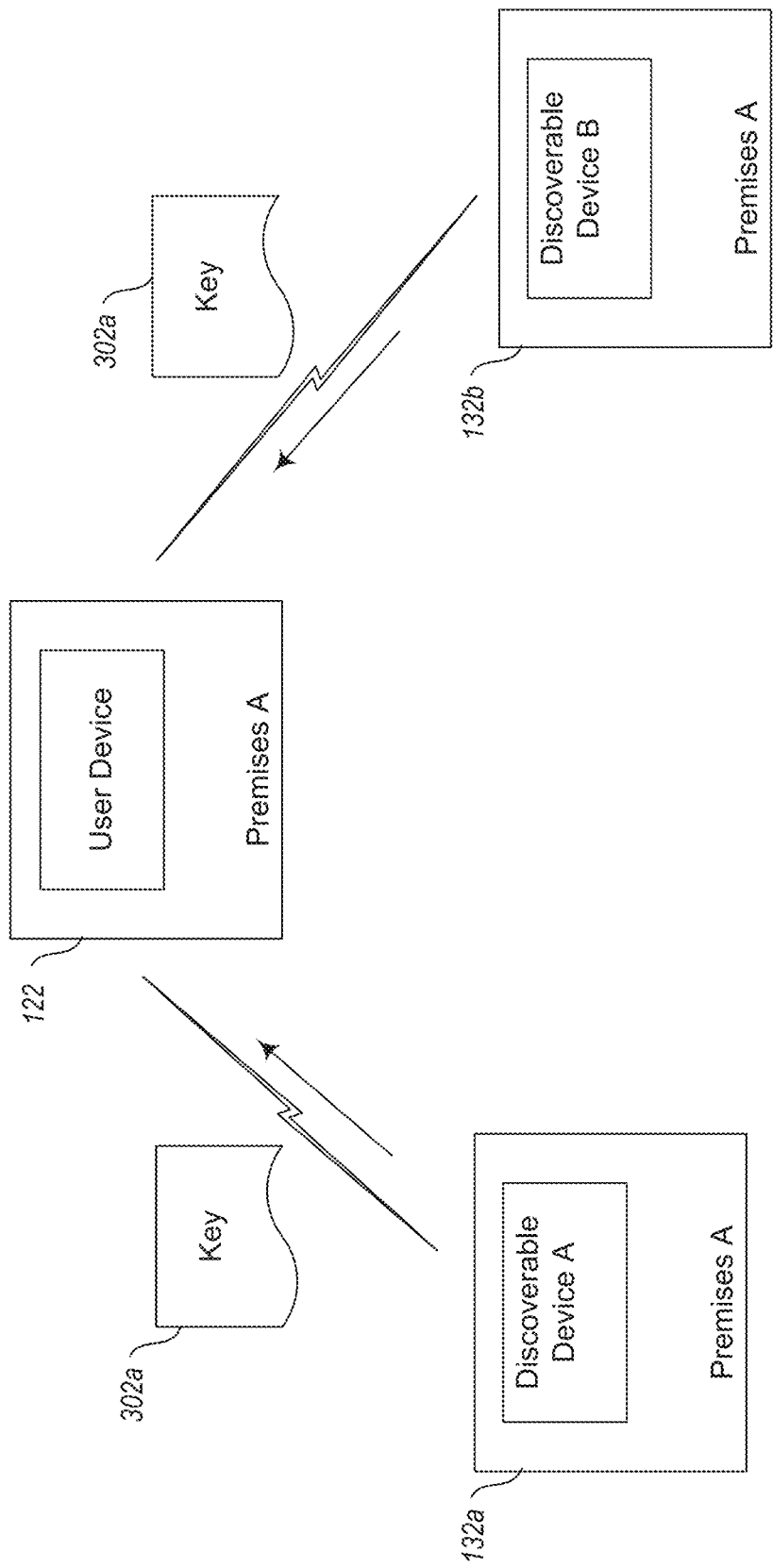
FIG. 3 illustrates an example of interactions between portions of an example embodiment of a proximity-based service discovery system.

FIG. 3 illustrates examples of interactions between portions of an example embodiment of a proximity-based service discovery system. Shown is user device 122 receiving a defined key 302*a* from discoverable device 132*a* and 132*b* directly via a short range wireless signal. The key 302*a* may have been initially communicated by the user device 122*a* over the LAN 210 (shown in FIG. 2) to the discoverable devices 132*a* and 132*b* such that the discoverable devices 132*a* and 132*b* could respond with the same key over a short range wireless signal along with a device identifier to enable the user device 122 within range of the discoverable devices 132*a* and 132*b* to differentiate the short range signal from other non-related short range signals (e.g., from non-discoverable stand-alone devices, or devices on other networks, etc.) and also to identify the particular device which sent the key. In many instances each discoverable device 132*a* and 132*b* may send a different key that specifically identifies the device, or the device identifier may be used as a key if the device identifier is already known by the user device 122.

C. Example Computing System Implementation

Figure 4:
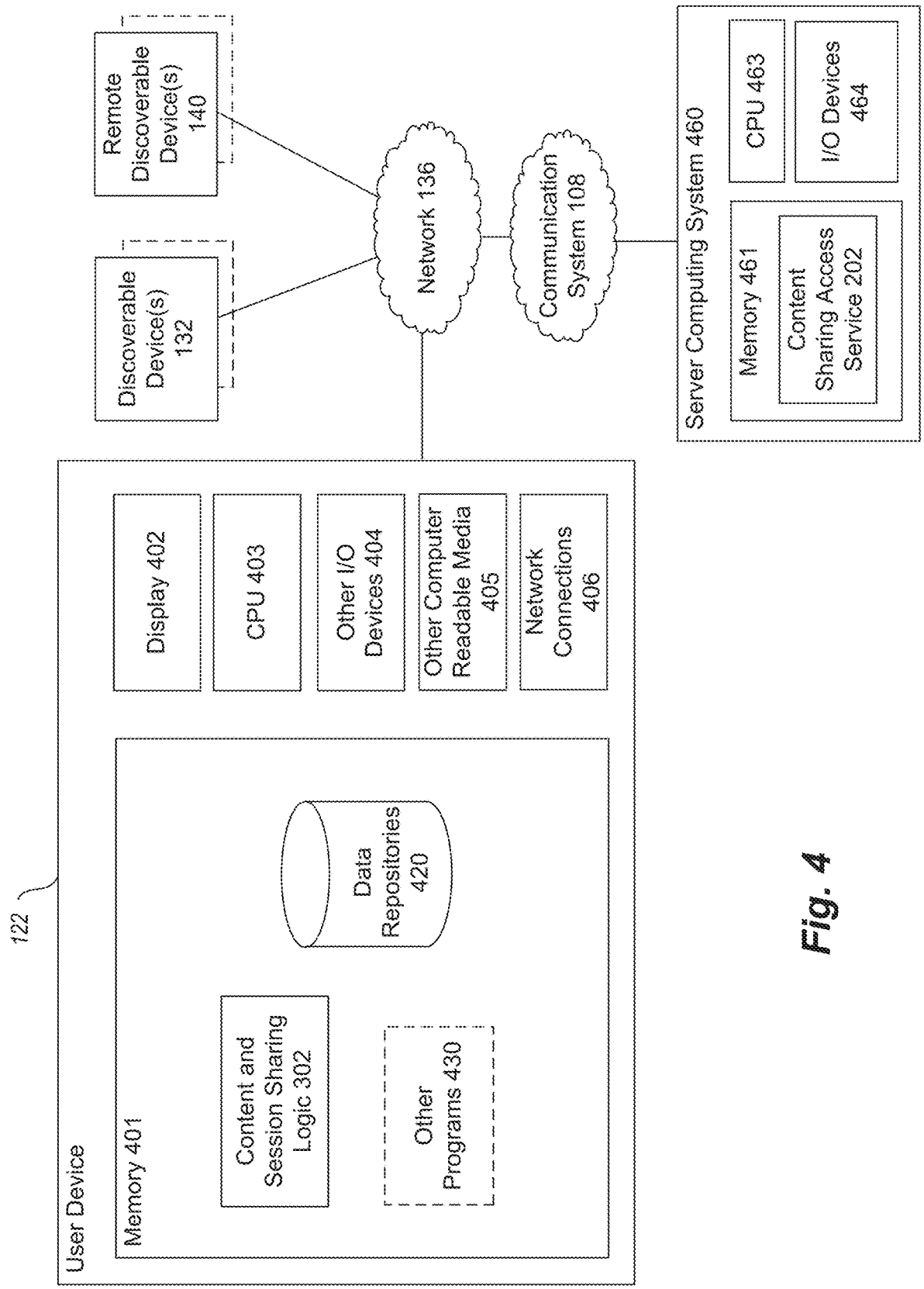
FIG. 4 is a block diagram of example computing systems suitable for executing example embodiments of a proximity-based service discovery system.

FIG. 4 is a block diagram of example computing systems suitable for executing example embodiments of a proximity-based service discovery system. FIG. 4 shows a user device computing system 122 that may be utilized to implement an embodiment of content and session sharing logic 302, and a server computing system 460 that may be utilized to implement an embodiment of the content and session sharing access service 202. The server computing system 460 may be provided by a program distributor (e.g., the program distributor 106 of FIGS. 1 and 2).

In one embodiment, the user device computing system 122 is configured to receive and display programming on a presentation device. In addition, the user device 122 may comprise one or more distinct computing systems/devices. Furthermore, each block shown may represent one or more such blocks as appropriate to a specific embodiment or may be combined with other blocks. Also, the content and session sharing logic 302 may be implemented in software, hardware, firmware, or in some combination to achieve the capabilities described herein.

In the embodiment shown, the user device comprises a computer memory ("memory") 401, a display 402 (which is different that the display 124 of other devices on the premises), one or more Central Processing Units ("CPU") 403, Input/Output devices 404 (e.g., keyboard, mouse, CRT or LCD display, and the like), other computer-readable media 405, and network connections 406. Content and session sharing logic 302 is shown residing in memory 401. In other embodiments, some portion of the contents of the content and session sharing logic 302 may be stored on and/or transmitted over the other computer-readable media 405. The content and session sharing logic 302 preferably executes on one or more CPUs 403 to share and/or access shared content, and/or to configure the user device 122 to perform operations related content sharing, as described herein. Other code or programs 430 (e.g., a user interface ("UI") manager, an audio/video processing module, a program guide manager module, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405, etc. The other receiving devices 450 may include similar components and/or blocks to those described with respect to the receiving device 116, although such are not shown in FIG. 4 here.

The content and session sharing logic 302 performs various of the described functionality of the user device 122 related to content and session sharing such as described with respect to FIGS. 2 and 3 above. For example, the content and session sharing logic 302 may determine which of the plurality of the discoverable devices 450 from which the short range wireless signal including the defined key was received. The content and session sharing logic 302 may provide a list of discovered devices with which a session may be shared over the communication system 108 via network 136 with the user device 122 based on the determination of which devices of the plurality of discoverable devices 132 and remote discoverable devices 140 from which the short range wireless signal including the defined key was received.

Also, the content and session sharing logic 302 may receive and/or otherwise obtain access control information, such as provided via the communication system 108, and determine based on such information a cryptographic content key to use for secure content sharing and/or access shared content generate, as well as perform encryption/ decryption as appropriate for sharing content in a secure content sharing group. In addition the content and session sharing logic 302 may interact via the communication system 108 with one or more other discoverable devices 450, and possibly with the server computing system 460, and/or with other computing systems or devices (not shown), to perform various of the described operations related to content sharing.

The data repositories 420 may include content, such as programming content and/or other types of content obtained from a program distributor (not shown) and/or one or more other computing systems (e.g., content providers 104a-104i, information providers 138a-138i from FIG. 1), such as via communication system 108. The content may be received from various other sources, including the other computer-readable media 405 and/or other computing systems or devices (not shown), such as computing systems/devices located at a customer premises with the user device 122, etc. As discussed elsewhere, such content may include programming, clips, audio/video, audio, images, and/or other data files, etc. In at least one embodiment, at least some of the content included in the data repositories 420 may be encrypted for restricted access by the user device 122 (e.g., by a program distributor or other content provider) and may include one or more corresponding encryption keys that are usable for decrypting at least portions such content.

In this illustrated embodiment, the server computing system 460 comprises a memory 461, one or more CPUs 463, Input/Output devices 464 (e.g., keyboard, mouse, CRT or LCD display, and the like), and/or various other components (not shown), e.g., computer readable media, network connections, etc. The content sharing access service 202 preferably executes on one or more CPUs 463 to detect and/or specify one or more discoverable devices 132 and remote discoverable devices 140 and provide this information to the user device 122. The content sharing access service 202 may also control to which device (e.g., user device 122 and/or one or more discoverable devices 132 and/or remote discoverable devices 140) a current session is being sent and to which device a current session may be sent. Furthermore, each block shown may represent one or more such blocks as appropriate to a specific embodiment or may be combined with other blocks. Also, the content sharing access service 202 may be implemented in software, hardware, firmware, or in some combination to achieve the capabilities described herein. In addition, one or more of the discoverable devices 132 and remote discoverable devices 140 may include computing systems such as, or similar to, that shown in FIG. 4 of the user device 122.

The content sharing access service 202 performs various of the described functionality, as described in FIGS. 2 and 3. In particular, the content sharing access service 202 may interact with the user device 122 and other discoverable devices 450 via the communication system 108 and network 136, such as to configure and/or otherwise manage user devices and discoverable devices 132 to participate in and or receive shared content or sessions.

In an example embodiment, components/modules of the content and session sharing logic 302 and/or the Content Sharing Access Service 202 are implemented using standard programming techniques. For example, the content and session sharing logic 302 and/or the Content Sharing Access Service 202 may be implemented as "native" executables running on the CPU 403 and CPU 463 respectively, along with one or more static or dynamic libraries. In other embodiments, the content and session sharing logic 302 and/or the Content Sharing Access Service 202 may be implemented as instructions processed by virtual machine. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by an hardware device module (HDM) implementation. Also, other functions could be implemented and/or performed by each component/module, and in different orders, and by different components/modules, yet still achieve the functions of the HDM.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an HDM.

Furthermore, in some embodiments, some or all of the components of the content and session sharing logic 302 and/or the Content Sharing Access Service 202 may be implemented or provided in other manners, such as at least partially in firmware and/or hardware, including, but not limited to one ore more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

D. Processes

Figure 5:
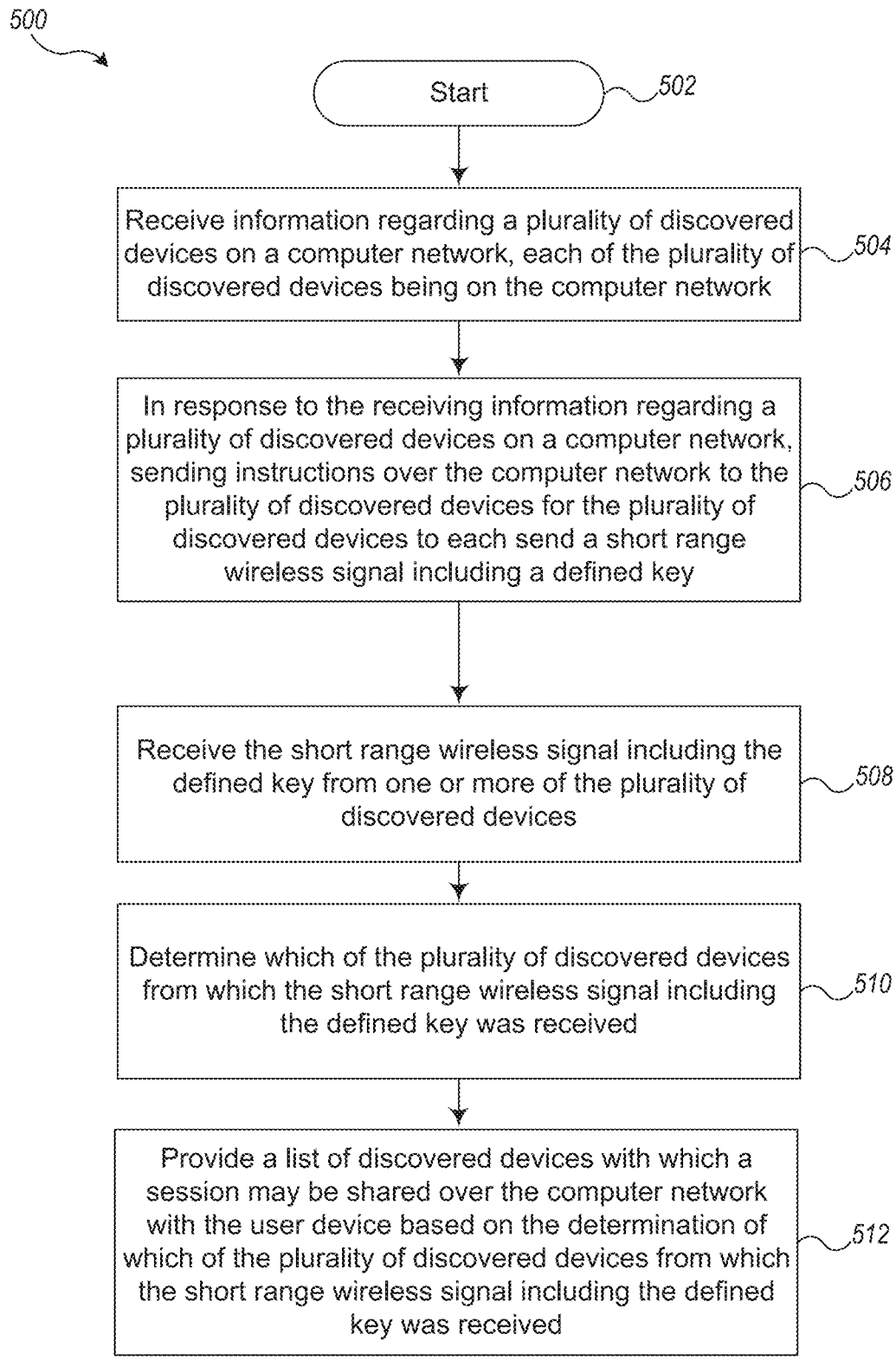
FIG. 5 is a flow diagram of an example proximity-based service discovery process.

FIG. 5 is a flow diagram of an example proximity-based service discovery process. In particular, FIG. 5 illustrates a process 500 that may be performed, for example, as part of the content and session sharing logic 302 executing on user device 122, such as illustrated with respect to FIGS. 2 and 3.

The illustrated process 500 starts at 502. At 504, the user device 122 receives information regarding a plurality of discovered devices on a computer network 136. Each of the plurality of discovered devices is on the computer network 136.

At 506, in response to the receiving information regarding a plurality of discovered devices on a computer network 136, the user device 122 sends instructions over the computer network 136 to the plurality of discovered devices for the plurality of discovered devices to each send a short range wireless signal including a defined key. The computer network 136 may be a local area network including devices discoverable to the user device 122. The plurality of discovered devices may include both devices that are in proximity to the user device and devices that are not in proximity to the user device.

At 508, the user device 122 receives the short range wireless signal including the defined key from one or more of the plurality of discovered devices.

At 510, the user device 122 determines which of the plurality of discovered devices from which the short range wireless signal including the defined key was received.

At 512, the user device 122 provides a list of discovered devices with which a session may be shared over the computer network with the user device based on the determination of which of the plurality of discovered devices from which the short range wireless signal including the defined key was received. This is in order to determine which of the plurality of discovered devices are in proximity of the user device 122 by determining that only devices from which the short range wireless signal was received are in proximity to the user device 122. The short range wireless signal may be, but is not limited to, one or more of: an audio signal; a near field communication signal; an infrared signal; a short range radio signal, an optical signal; a radio frequency identification signal; and a signal sent using a short range wireless protocol, etc. Also, the short range wireless signal may be received directly from the discoverable devices or over a variety of different short range wireless networks including a Bluetooth™ or other a personal area network.

The process may also send a session from the user device over the computer network to a selected one of the list of discovered devices and may include video (e.g., streaming video), audio or other data content. In some embodiments, sending the session includes sending a state of an application running on the user device over the computer network and may occur automatically once a selected one of the list of discovered devices is selected.

In various embodiments, the process determines which of the plurality of discovered devices sent the short range wireless signal by matching a device identifier received via the short range wireless signal with a stored reference device identifier of at least one of the plurality of discovered devices. The device identifier may, for example, be a hardware device identifier (e.g., a MAC address) or a network address.

Figure 6:
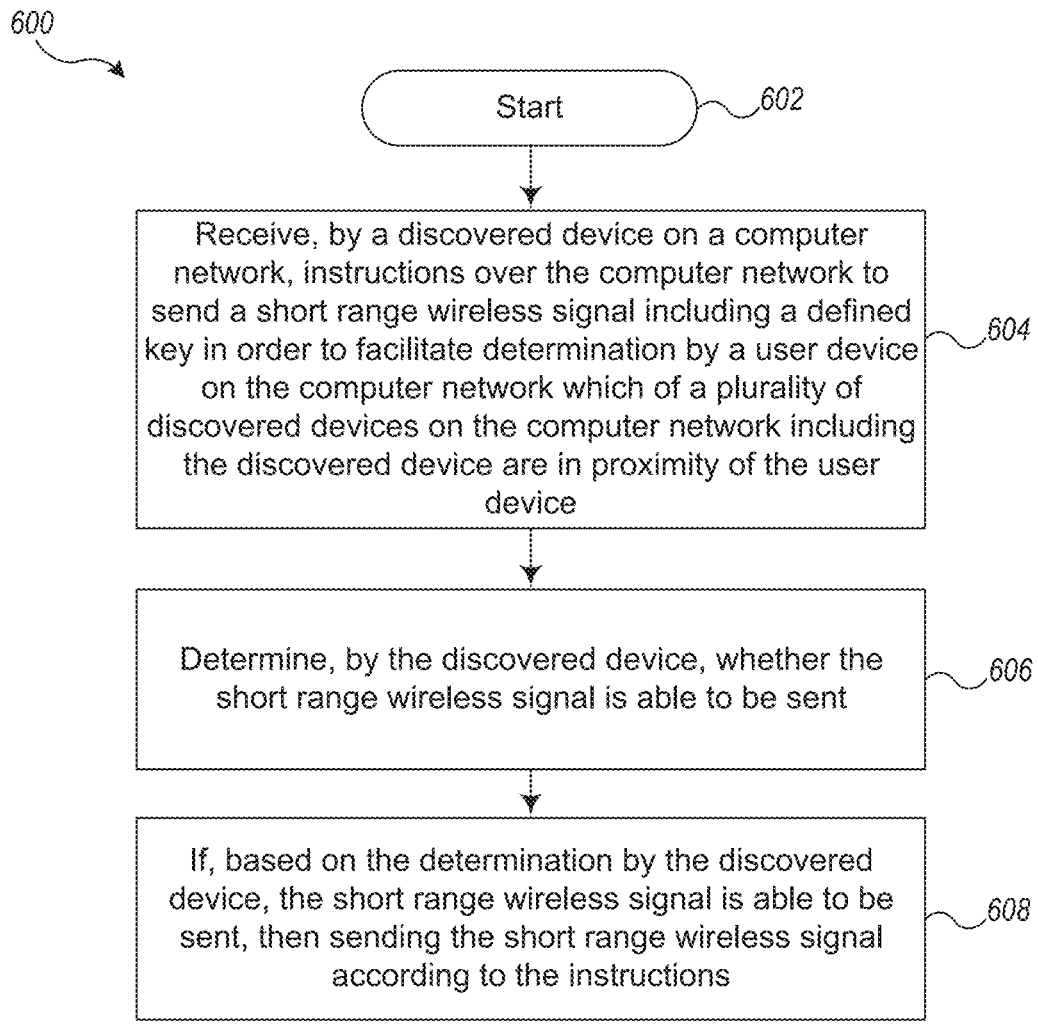
FIG. 6 is a flow diagram an example proximity-based service discovery process from the perspective of a discovered device.

FIG. 6 is a flow diagram an example proximity-based service discovery process from the perspective of a discovered device. In particular, FIG. 6 illustrates process 600 that may be performed, for example, by a computing system of one or more of the discoverable devices 132a and 132b or remote discoverable devices 140a and 140b of FIG. 2.

In FIG. 6, the illustrated process 600 starts at 602. At 604, the discoverable device (e.g., discoverable device 132a) receives instructions over the computer network 136 to send a short range wireless signal including a defined key. This is sent in order to facilitate determination by a user device 122 on the computer network 136 which of a plurality of discovered devices on the computer network 136, including the discovered device 132a, are in proximity of the user device 122.

At 606, the discoverable device 132a determines whether the short range wireless signal is able to be sent. In some instances, the device may not have such short range wireless functionality.

At 608, if, based on the determination, the short range wireless signal is able to be sent, the discoverable device 132a then sends the short range wireless signal according to the instructions. The process may also send one or more of a key and a device identifier of the in the short range wireless signal. The discoverable device 132a may further receive a session from the user device 122 over the computer network 136 in response to the sending the short range wireless signal according to the instructions.

In some embodiments, the discoverable device 132a may receive, in response to the sending the short range wireless signal including the defined key, a response from the user device 122 identifying the user device and then send a session to the user device 122 over the computer network 136 instead of receiving a session form the user device 122. The sending of the session by the user device 122 is also in response to the sending the short range wireless signal by the discoverable device 132a.

While various embodiments have been described hereinabove, it is to be appreciated that various changes in form and detail may be made without departing from the spirit and scope of the invention(s) presently or hereafter claimed.

The invention claimed is:

1. A system comprising:
a memory of a device;
a processor coupled to the memory configured to:
receive, from one or more of a plurality of discovered devices that are on a computer network, a short range wireless signal over a wireless network, wherein the plurality of discovered devices represent an updated list of discoverable devices on the computer network, wherein the updated list of discoverable device is determined based on a response received from each discoverable device in the updated list, wherein the receiving the short range wireless signal over the wireless network includes:
receiving the short range wireless signal not over the computer network on which the one or more of a plurality of devices were discovered by the device, but instead over the wireless network, and separate from a discoverable device protocol used over the computer network;
determine which of the plurality of discovered devices are in proximity of the device by determining that the one or more of the plurality of discovered devices from which the short range wireless signal including a defined key was received are in proximity to the device;
enable a session to be shared between the device and at least one of the one or more of the plurality of discovered devices over the computer network by the processor at least being configured to enable a session with at least one of the one or more of the plurality of discovered devices over the computer network that is determined to be in proximity to the device.

2. The system of claim 1 wherein the proximity is defined by a range of the short range wireless signal.

3. The system of claim 1 wherein the processor is further configured to send, not over the computer network, a short range wireless signal to determine whether one or more of the plurality of discovered devices on the computer network are in proximity to the device and wherein the receiving, not over the computer network, the short range wireless signal from the one or more of a plurality of discovered devices on the computer network is in response to the sending, not over the computer network, the short range wireless signal over the wireless network.

4. A non-transitory computer-readable storage medium having computer executable instructions thereon, that when executed by a computer processor, cause the following method to be performed:
receiving, from one or more of a plurality of discovered devices that are on a computer network, a short range wireless signal over a wireless network, wherein the plurality of discovered devices represent an updated list of discoverable devices on the computer network, wherein the updated list of discoverable device is determined based on a response received from each discoverable device in the updated list, wherein the receiving the short range wireless signal over the wireless network includes:
receiving the short range wireless signal not over the computer network on which the one or more of a plurality of devices were discovered by the device, but instead over the wireless network, and separate from a discoverable device protocol used over the computer network;
determining which of the plurality of discovered devices are in proximity of a device by determining that the one or more of the plurality of discovered devices from which the short range wireless signal including a defined key was received are in proximity to the device; and
enabling a session to be shared between the device and at least one of the one or more of the plurality of discovered devices over the computer network by at least enabling a session with at least one of the one or more of the plurality of discovered devices over the computer network that is determined to be in proximity to the device.

5. The non-transitory computer-readable storage medium of claim 4 wherein the computer executable instructions thereon, when executed by the computer processor, further cause the following method to be performed:
send, not over the computer network, a short range wireless signal to determine whether one or more of the plurality of discovered devices on the computer network are in proximity to the device and wherein the receiving, not over the computer network, the short range wireless signal from the one or more of a plurality of discovered devices on the computer network is in response to the sending, not over the computer network, the short range wireless signal over the wireless network.

6. A method comprising:
receiving, from one or more of a plurality of discovered devices that are on a computer network, a short range wireless signal over a wireless network, wherein the plurality of discovered devices represent an updated list of discoverable devices on the computer network, wherein the updated list of discoverable device is determined based on a response received from each discoverable device in the updated list, wherein the receiving the short range wireless signal over the wireless network includes:
receiving the short range wireless signal not over the computer network on which the one or more of a plurality of devices were discovered by the device, but instead over the wireless network, and separate from a discoverable device protocol used over the computer network;
determining which of the plurality of discovered devices are in proximity of a device by determining that the one or more of the plurality of discovered devices from which the short range wireless signal including a defined key was received are in proximity to the device; and
enabling a session to be shared between the device and at least one of the one or more of the plurality of discovered devices over the computer network by at least enabling a session with at least one of the one or more of the plurality of discovered devices over the computer network that is determined to be in proximity to the device.

7. The method of claim 6 wherein the proximity is defined by a range of the short range wireless signal.

8. The method of claim 6, further comprising:
sending, not over the computer network, a short range wireless signal to determine whether one or more of the plurality of discovered devices on the computer network are in proximity to the device and wherein the receiving, not over the computer network, the short range wireless signal from the one or more of a plurality of discovered devices on the computer network is in response to the sending, not over the computer network, the short range wireless signal over the wireless network.

* * * * *